United States Patent [19]
Roskam

[11] Patent Number: 6,120,239
[45] Date of Patent: Sep. 19, 2000

[54] COMPENSATING STACKING MACHINE AND METHOD OF USING SAME

[76] Inventor: Mervin W. Roskam, 5183 Greytone Way, Hoover, Ala. 35242

[21] Appl. No.: 09/143,015

[22] Filed: Aug. 28, 1998

Related U.S. Application Data

[60] Provisional application No. 60/057,249, Aug. 29, 1997.

[51] Int. Cl.[7] .................................................. B65G 57/07
[52] U.S. Cl. ..................... 414/791.2; 198/456; 414/407
[58] Field of Search .................................. 271/237, 240, 271/213, 220; 198/456; 414/789.1, 791.2, 907

[56] References Cited

U.S. PATENT DOCUMENTS

| | | | |
|---|---|---|---|
| 4,381,108 | 4/1983 | Newsome | 198/456 |
| 4,657,465 | 4/1987 | Aoki | 414/907 |
| 5,387,077 | 2/1995 | Yatsuka et al. | 414/907 |

*Primary Examiner*—Gregory A. Morse
*Attorney, Agent, or Firm*—Thomas, Kayden, Horstemeyer & Risley, L.L.P.

[57] ABSTRACT

A machine and method is disclosed for stacking product, including but not limited to, cardboard, magazines, newspapers, newspaper supplements, flyers, press signatures, and softcover books. The stacking machine includes an infeed assembly for receiving a product stream or flow. The infeed assembly includes a belt jogger assembly for aligning product as it enters the machine. A transport assembly delivers product from the infeed assembly to a stacking assembly. The stacking assembly includes an interrupter that creates a gap in the product stream and assists in accumulating a single lift of product on a separator. The separator delivers a single lift of product to one of a pair of elevators, which deliver a first application of compression to the lift. After the first compression, the lift is transferred to a compression apparatus where a second round of compression is applied in the process of forming a final stack. Each time a lift is delivered to the compression apparatus, compression is applied to the stack, thus many of the lifts will be compressed several times until the stack is ejected from the machine.

19 Claims, 8 Drawing Sheets

COMPENSATING STACKING MACHINE AND METHOD OF USING SAME

CROSS REFERENCE TO RELATED APPLICATION

This application claims the benefit of U. S. Provisional Application No. 60/057,249, entitled "Compensating Stacking Machine And Method Of Using Same," filed Aug. 29, 1997, which is incorporated herein by reference.

BACKGROUND OF THE INVENTION

The present invention relates generally to the field of automated stacking machines, and, more particularly, to stacking machines that use compression and can use compensation in forming the stacks.

For mass production of printed media, stacking machines are used to organize, count, stack, compress and package product such as magazines, newspapers, newspaper supplements, flyers, and press signatures for shipment. These machines typically include a feeder or supply component comprising a conveyor system for receiving product to be stacked. Next, through a combination of conveyors and mechanical apparatus, the products are organized into stacks, which are then compressed for shipment as they exit the machine. For maximum stability of the compressed stacks, compensation is often used in which stack portions are alternately rotated 180° during compression to counteract any tendency or bias to lean in a specific direction.

While existing stacking machines are useful for their intended purposes, they are accompanied with several drawbacks: First, misshapen or misaligned product are prone to jam inside the machines resulting in lost production time and sometimes requiring disassembly of the machine to free the jam. Second, existing machines use plates, rollers or similar devices to move belts in and out to align product, which is ineffective in some applications. Third, when changing product lines, existing machines frequently require adjustments to the conveyor belt assembly to accommodate a new product size. These adjustments can be time consuming and potentially result in more product jams inside the machine if the adjustments are inaccurate. Fourth, the stacking apparatus used by existing machines is often inefficient by requiring a product stack portion or lift to be filled and expelled from the machine before the stacking apparatus is ready to receive more product. Fifth, although compression of the product is a critical factor in minimizing space and maximizing stability in shipping, most existing stacking machines are designed to provide only one or no application of compression to the product, particularly at high speed. Finally, existing stacking machines, due to their location of the product counter, do not consistently give accurate product quantities per lift or stack portion.

Accordingly, there exists a need for an improved compensating stacking machine that reduces jams resulting from entry of misshapen or misaligned product. Furthermore, it is desirable that maximum product alignment be achieved through the use of belt joggers. It is also desirable that the compensating stacking machine accommodate multiple product lines with a minimum of adjustments when switching between lines. Additionally, it is desirable that the stacking machine provide an improved stacking assembly capable of processing more than one lift or stack portion at a time and that each lift, stack portion, or product stack is compressed at least once and preferably more than once. For uniformity in lift size and quantity, it is desirable to attain an accurate count of product before forming the lift.

SUMMARY OF THE INVENTION

Certain objects, advantages and novel features of the invention will be set forth in part in the description that follows and in part will become apparent to those skilled in the art upon examination of the following or may be learned with the practice of the invention.

To achieve the advantages and novel features, the present invention is generally directed to a machine and method for stacking products, including but not limited to, cardboard, magazines, newspapers, newspaper supplements, flyers, press signatures and softcover books for shipment.

Specifically, the present invention includes an infeed assembly for receiving a product stream or flow. The infeed assembly includes a belt jogger assembly for aligning product as it enters the machine. A transport assembly delivers product from the infeed assembly to a stacking assembly. The stacking assembly includes an interrupter that creates a gap in the product stream and assists in accumulating a single lift of product on a separator. The separator delivers a single lift of product to one of a pair of elevators, which deliver a first application of compression to the lift. After the first compression, the lift is transferred to a compression apparatus where a second round of compression is applied in the process of forming a final stack. Each time a lift is delivered to the compression apparatus, compression is applied to the stack, thus many of the lifts will be compressed several times until the stack is ejected from the machine.

The invention can also be viewed as providing a method for stacking product. In this regard, the method can be broadly summarized by the following steps: A product stream is provided and channeled through a belt jogger assembly for alignment. Once aligned, the product stream is conveyed to a stacker assembly where an interrupter is used to create a gap in the product flow stream to assist in setting apart a single lift. Product is allowed to accumulate onto a separator until a single lift of product is obtained. The single lift is delivered to a pair of elevators where a first round of compression is applied. After the compression is complete, the lift is delivered to a turntable where a compressor plate applies a second round of compression.

In accordance with an aspect of the present invention, the belt jogger assembly includes belt joggers, driven by drive pulleys having a plurality of sides formed thereon, that align the passing flow of product by pulsating the belt speed. Moreover, the pulsating action of the joggers serves to more uniformly distribute the product in the product stream.

In accordance with another aspect of the present invention, the belt joggers mechanically cooperate with outer belt assemblies such that adjustments to the belt joggers based on product size automatically create corresponding adjustments to the outer belt assemblies ensuring the right combination of belt jogger and outer belt assembly positioning.

In accordance with yet another aspect of the present invention, the stacking assembly includes an air powered interrupter that creates a gap in the product stream to assist in separating the product into a lift or stack portion.

In accordance with still another aspect of the present invention, the stacking assembly includes a pair of elevators for applying compression to each lift or stack portion individually.

In accordance with still another aspect of the present invention, the compression apparatus is rotatable allowing compensation to be applied to the product as the lifts are stacked.

Additional advantages will become apparent from a consideration of the following description and drawings:

BRIEF DESCRIPTION OF THE SEVERAL VIEWS OF THE DRAWINGS

The present invention will be more readily understood from the following detailed description when read in conjunction with the accompanying drawings, in which.

DETAILED DESCRIPTION OF THE PREFERRED EMBODIMENT

Figure 1:
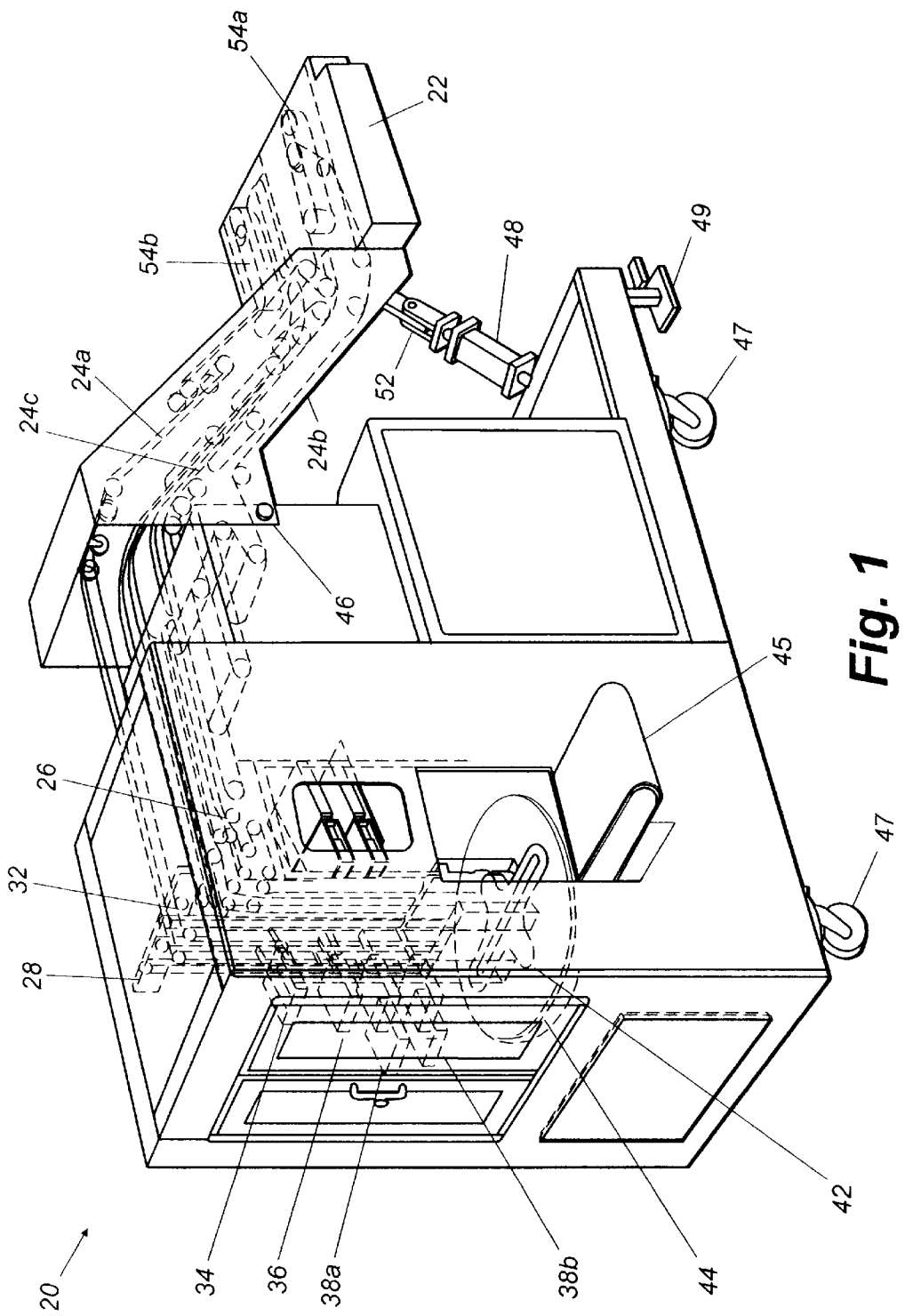
FIG. 1 is a perspective view of a compensating stacking machine according to the present invention.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention.

Referring now to FIG. 1, a perspective view of a compensating stacking machine 20 according to the instant invention is shown. Stacking machine 20 receives an incoming product stream to be stacked through an infeed assembly comprising a belt jogger assembly 22 and trapped belt conveyor 24a,b. As used herein, product refers most generally to any item having sufficient flexibility and possessing a sufficiently planar geometry to lend itself to stacking. Examples of such items include, but are not limited to, cardboard, magazines, newspapers, newspaper supplements, flyers, press signatures and softcover books.

Stacking machine 20 further comprises a feed table belt assembly 26 for transporting product from the infeed assembly to a stacking assembly. Feed table assembly 26 delivers product to a pair of rotary joggers 28 (one shown) for reception in the stacking assembly. A laser counter 32 is located in proximity to the rotary joggers 28 to count product as it is delivered.

The stacking assembly portion of stacking machine 20 includes a top interrupter 34 that is used to create gaps in the product stream that enters the stacking assembly. Top interrupter 34 is designed to retract from the flow of product thereby allowing product to accumulate on lift separator 36. Product is allowed to accumulate on the platform provided by lift separator 36 until a single "lift" quantity is reached. At that point, lift separator 36 will retract thereby delivering the product lift to either left elevator 38a or right elevator 38b. The left and right elevators 38a,b are designed to descend within the stacking assembly to meet turntable compressor plate 42, which ascends to receive the lift. Turntable compressor plate 42 is received in a depression in turntable 44 such that compressor plate 42 is flush with turntable 44. A delivery belt 45 is positioned proximal to turntable 44 where product is expelled from stacking machine 20.

Disposed on the undercarriage of the stacking machine 20 are a plurality of wheels 47, or the like, to provide for mobility of the stacking machine 20. Also disposed on the stacking machine 20 undercarriage is a position locking means 49, as is commonly known in other arts.

With this general understanding of the present invention, the architecture and operation of the various sub-assemblies of stacking machine 20 will be described hereafter.

Figure 2:
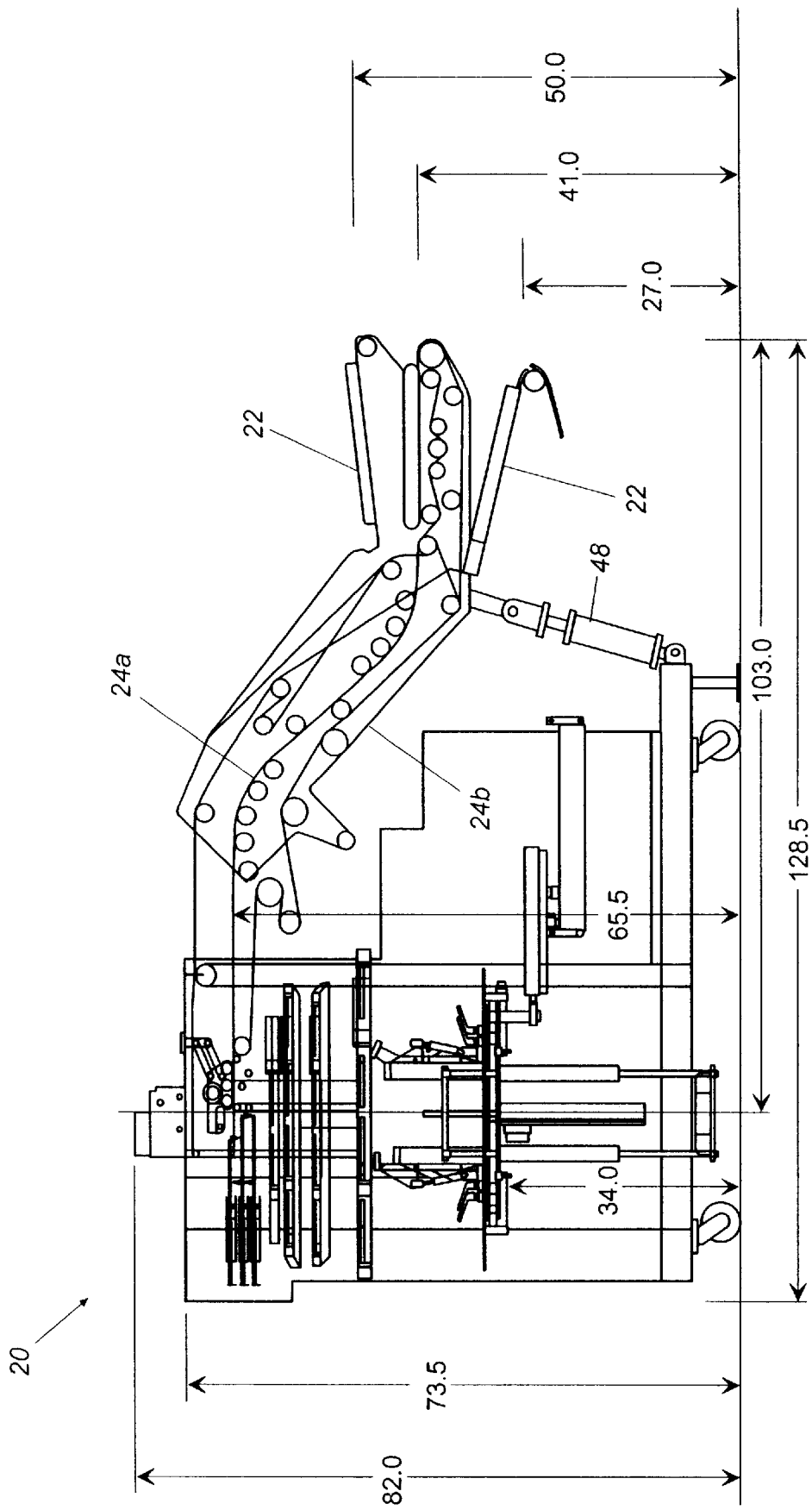
FIG. 2 is an elevation view of the compensating stacking machine of FIG. 1 showing the adjustment capability of the product infeed assembly.

Referring now to FIG. 2, the incoming product enters stacking machine 20 via belt jogger assembly 22. The entire infeed assembly of belt jogger assembly 22 and trapped belt conveyor 24a,b is designed to rotate about pivot 46 anchored in the housing of machine 20 through operation of pneumatic cylinder 48, which is attached to the base of machine 20, to allow the infeed assembly to accommodate varying product supply conveyor heights. Pneumatic cylinder 48 is connected to belt jogger assembly 22 via a slotted coupling 52 (see FIG. 1), which further enhances the height adjustment capability for the infeed assembly.

In addition to matching the height of the belt jogger assembly 22 to the infeed conveyor, pneumatic cylinder 48 can be used to reject misshapen or misaligned products before they proceed into the internals of stacking machine 20 where they could cause a jam. For example, pneumatic cylinder 48 can be activated by pressing a button on a touchscreen display (not shown) or by pressing a button (not shown) on the side of stacking machine 20 to swing belt jogger assembly 22 and trapped belt conveyor 24a,b upward to cause product to fall off of the end of the supply conveyor that is delivering product to the stacking machine 20. A basket or collection bin can be positioned underneath belt jogger assembly 22 and the end of the product supply conveyor to collect the rejected product. Advantageously, pivot 46 is positioned near the location where trapped belt conveyor 24a,b joins the body of stacking machine 20, thus allowing for a wide degree of adjustment due to the large radius.

Figure 3A:
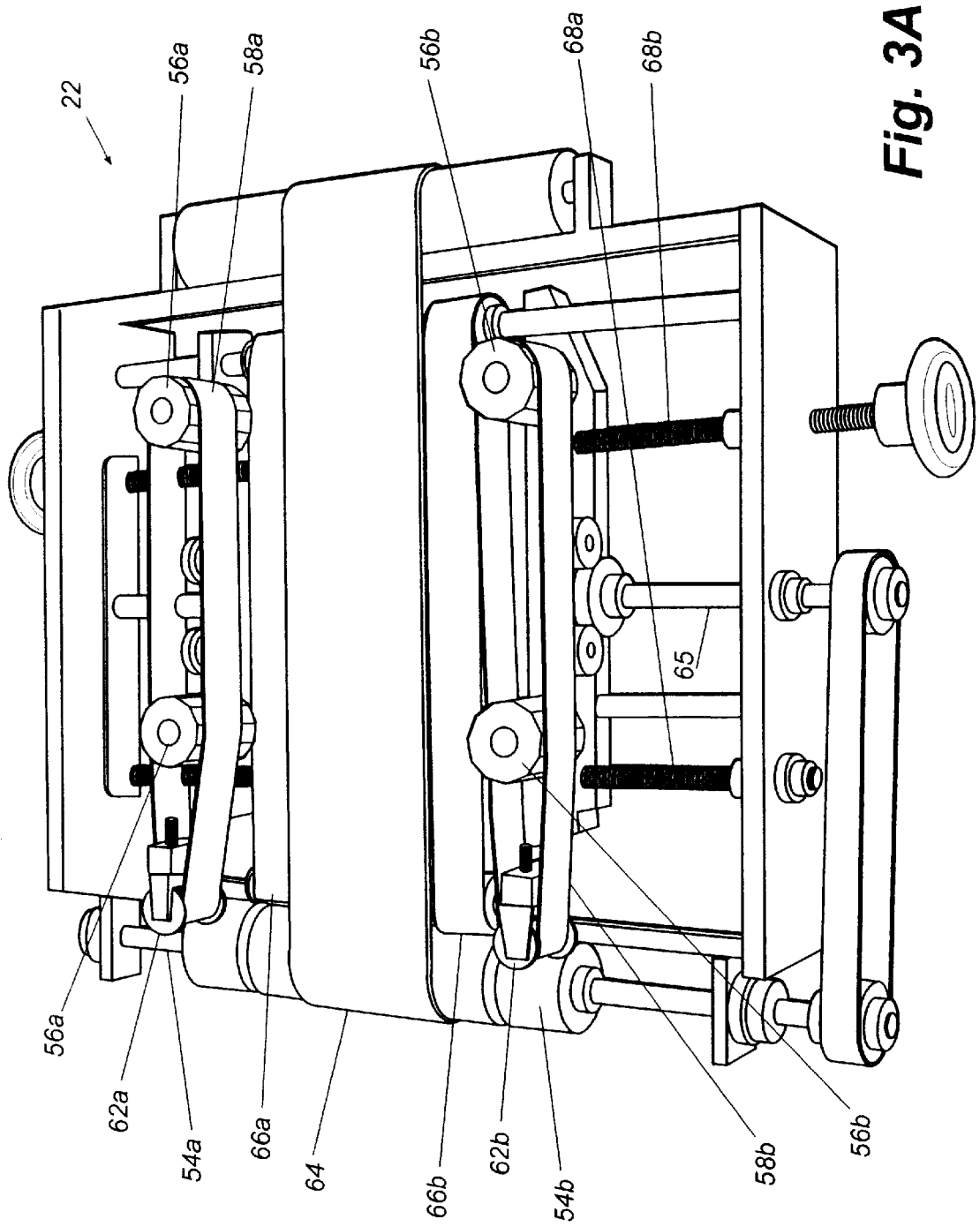
FIG. 3A is a perspective view of the belt jogger assembly used in the infeed assembly of FIG. 2.
Figure 3B:
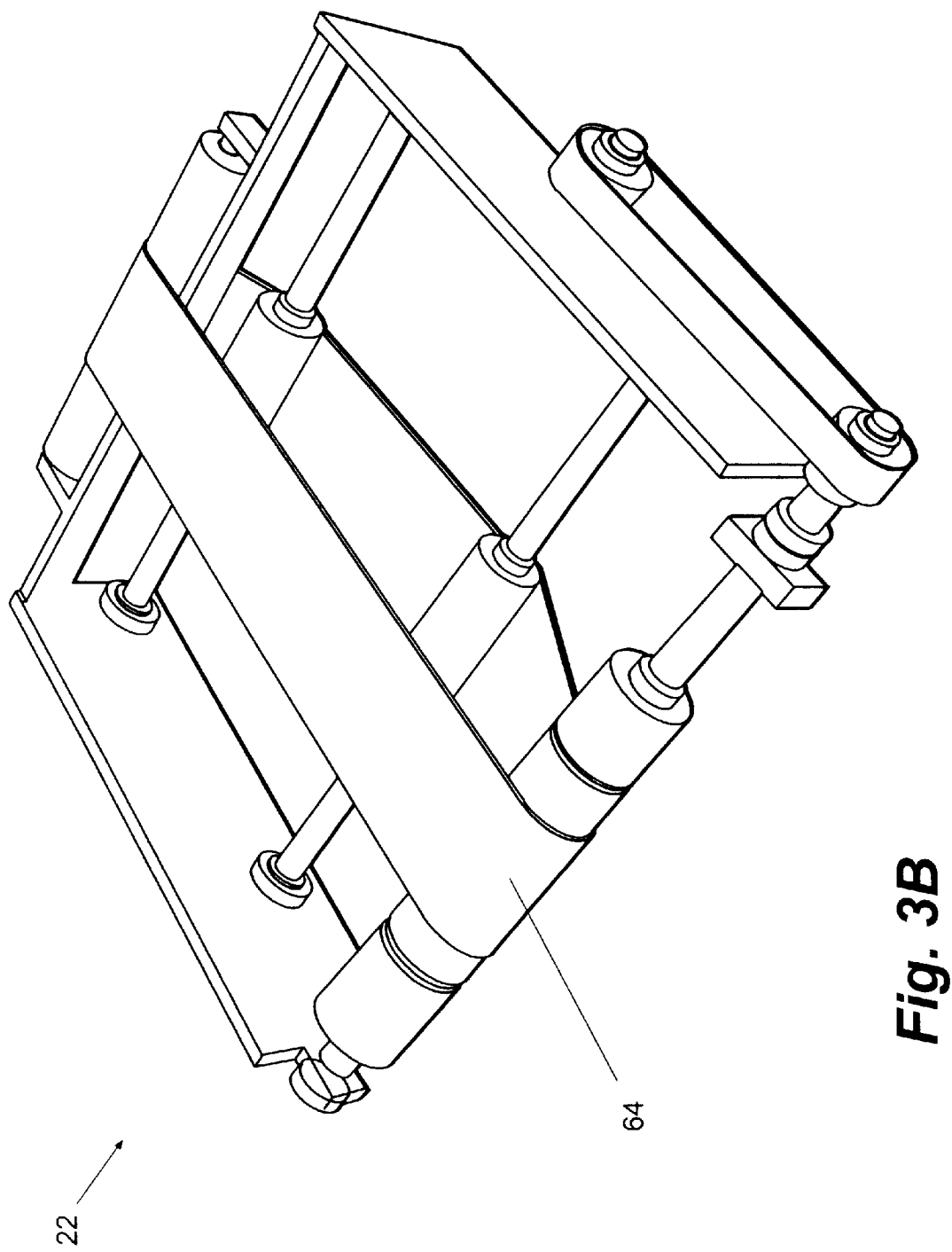
FIG. 3B is a perspective view of the infeed table belt used in the belt jogger assembly of FIG. 3A.

As discussed in the foregoing, stacking machine 20 receives product to be stacked through belt jogger assembly 22. Referring now to FIG. 3A, belt jogger assembly 22 includes two uniquely designed belt joggers 54a,b. Belt joggers 54a,b are positioned on both sides of belt jogger assembly 22 to ensure that product is oriented correctly as it proceeds through stacking machine 20. Specifically, belt joggers 54a,b use drive pulleys 56a,b having a plurality of flat sides formed thereon to provide a pulsating effect in the speed of belts 58a,b as product passes by. Typically, drive pulleys 56a,b include three or four flat sides to achieve the desired effect. Product passes between belt joggers 54a,b on infeed table belt 64, shown best in FIG. 3B, and outer infeed belts 66a,b. It should be noted that infeed table belt 64 is shown in FIGS. 3A and 3B as a separate belt from lower belt section 24b of trapped belt conveyor 24a,b for illustrative purposes only. When belt jogger assembly 22 and trapped belt conveyor 24a,b are assembled to one another to form the infeed assembly, a single, endless belt is used to implement both infeed table belt 64 and lower belt section 24b.

Infeed table belt 64, outer infeed belts 66a,b, and belt joggers 54a,b are driven by driveshaft 65. Belts 58a, b are endless and cycle on drive pulleys 56a,b and idler pulleys 62a,b. Product is more effectively aligned on infeed table belt 64 through both the pushing process of belt joggers 54a,b and pulses from the varying speed of belts 58a,b. Moreover, the pulsating effect creates a more uniform distribution of product in the product stream. That is, gaps in the product stream are closed while concentrations of product in the stream are spaced apart.

Figure 3C:
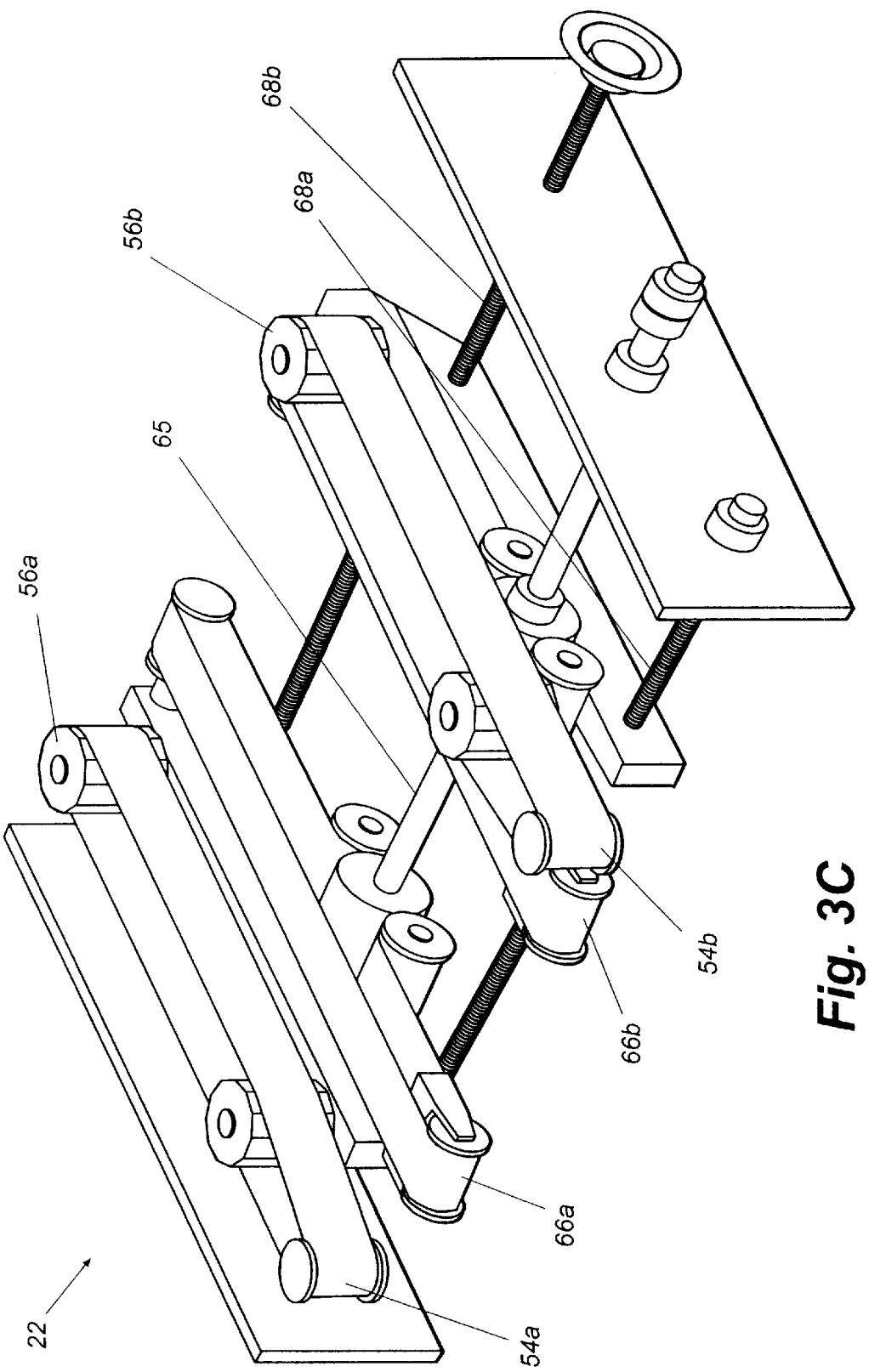
FIG. 3C is a perspective view of the belt jogger assembly of FIG. 3A without the infeed table belt of FIG. 3B.

Referring now to FIG. 3C, an important feature of belt jogger assembly 22 is that belt joggers 54a,b can be adjusted to conform to the size of the product being processed. Advantageously, adjustments to belt joggers 54a,b are simultaneously transferred to outer infeed belts 66a,b via a mechanical relationship. Specifically, belt joggers 54a,b are each threadably mounted on acme screws 68a,b that adjust the horizontal position of belt joggers 54a,b relative to infeed table belt 64 (see FIG. 3A). Outer infeed belts 66a,b, which are preferably smaller than infeed table belt 64, move in concert with belt joggers 54a,b through roller chains (not shown) that are controlled by acme screws 68a,b. Outer infeed belts 66a,b are arranged in a slightly depressed position with respect to infeed table belt 64. Consequently, as belt joggers 54a,b move in towards infeed table belt 64, outer infeed belts 66a,b will slide underneath infeed table belt 64 leaving infeed table belt 64 as the sole means of transport for narrow products. The linkage of belt joggers 54a,b to outer infeed belts 66a,b results in faster and more accurate adjustments when switching stacking machine 20 over to accommodate a new product line. Heretofore, a technician would have to adjust both belt joggers 54a,b and outer infeed belts 66a,b separately resulting in frequent jams and alignment problems until a proper configuration could be obtained through an iterative process. It is envisioned that belt joggers 54a,b as described herein could be used in alternative material handling machinery where product alignment is desired. For example, the belt jogger assembly 22 and/or the individual belt joggers 54a,b could be used in conveyor systems to maintain the alignment and proper distribution of a product stream. The belt jogger assembly 22 and/or belt joggers 54a,b may also be used ahead of a trimmer machine as proper alignment is critical if product is to be successfully trimmed. Finally, the belt jogger assembly 22 and/or belt joggers 54a,b can be used at the infeed of other types of stacking machines.

Returning to FIG. 1, once product has passed through belt jogger assembly 22, it will be conveyed upward through trapped belt conveyor 24a,b. Trapped belt conveyor 24a,b is comprised of two endless belt sections: upper belt section 24a and lower belt section 24b. Each section comprises a series of endless belts carried by idler pulleys positioned adjacent one another. The two endless belt sections, 24a and 24b, are positioned opposite one another such that the surface of each belt in each section contacts a corresponding belt in the opposite section over a portion of its circumference to form a contact region 24c. Product is effectively "trapped" in contact region 24c and transported through stacking machine 20. In addition to providing a transport function, trapped belt conveyor 24a,b also flattens the product between the belts in contact region 24c. While a series of belts are used in the preferred embodiment, it is envisioned that alternative embodiments could use a single broad belt for each of the belt sections.

Trapped belt conveyor 24a,b delivers the product to feed table belt assembly 26, which continues the progression of product towards the stacking assembly. Upper belt section 24a extends over the top of feed table belt assembly 26. As a result, upper belt section 24a and feed table belt assembly 26 operate in the same manner as trapped belt conveyor 24a,b with product being confined and transported between endless belts cycling on idler pulleys. Thus, upper belt section 24a and feed table belt assembly 26 form a second trapped belt conveyor system.

Figure 4A:
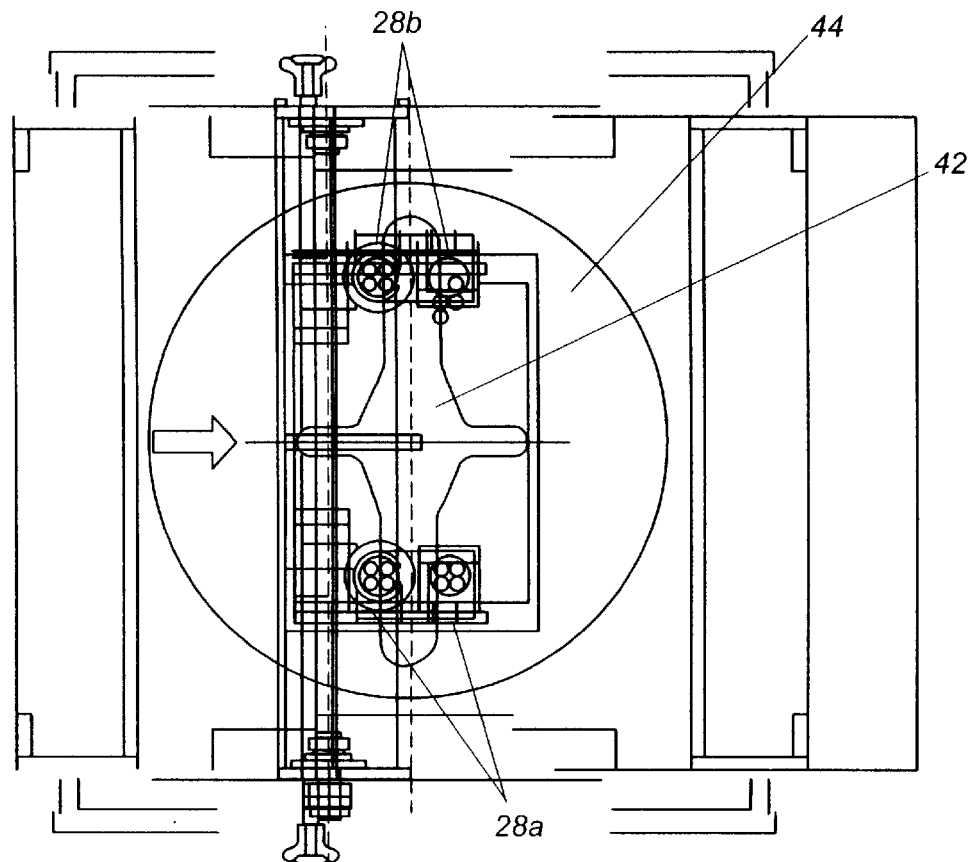
FIG. 4A is a plan view of rotary joggers used to guide product into the stacking assembly portion of the compensating stacking machine of FIG. 1.
Figure 4B:
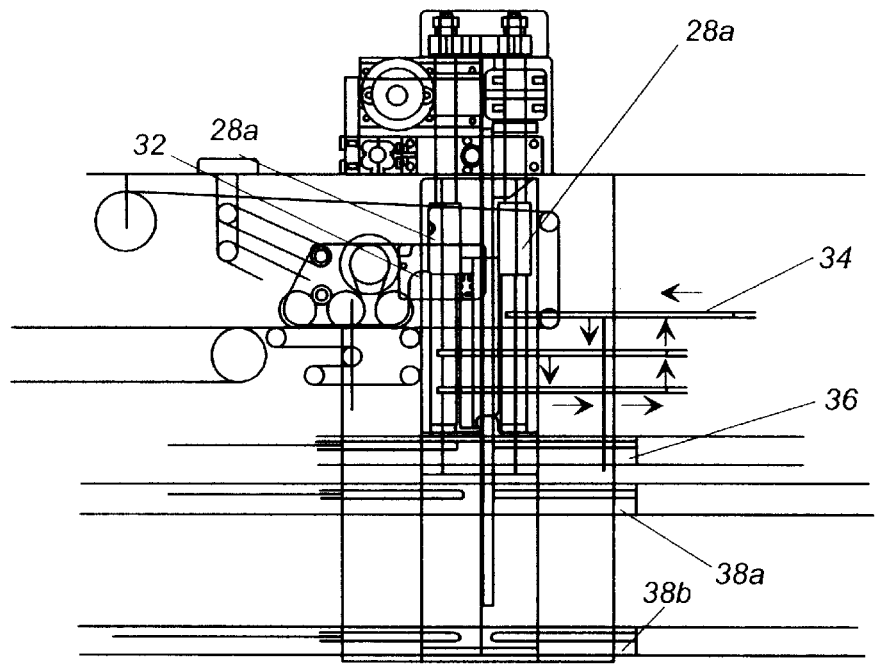
FIG. 4B is an elevation view of the rotary joggers of FIG. 4A and their relationship to the stacking assembly.

Referring now to FIGS. 4A, 4B and 1, a pair of rotary joggers 28a,b are shown to provide final side-to-side alignment adjustments and drive the product towards a stop for proper front-to-back alignment. A laser counter 32 is advantageously located in the housing or box containing the rotary joggers to ensure an accurate count of the product. The location of laser counter 32 at a position after the product has already been evaluated for proper sizing, aligned, and uniformly distributed through the belt jogger assembly 22 ensures more accurate counts of product as the likelihood of product jams at this stage in the stacking process is substantially minimized. This stands in contrast to the practice in prior art stacking machines of counting product as it enters the machine or at a "stream stop area" resulting in inaccurate counts when product jams occur or when product is located too close to one another for the counter to properly distinguish one item from the next.

At this stage the product is ready to enter the stacking assembly portion of stacking machine 20. Shown best in FIGS. 5 and 4B, the stacking assembly comprises a top interrupter 34, a lift separator 36, and left and right elevators 38a and 38b. Product will begin to descend between supports 74 and collect on top interrupter 34 until a desired count is reached on laser counter 32 or, if a stack height sensor is used, until the desired height is reached. Once this threshold is reached, top interrupter 34 retracts thereby dropping the partial lift onto lift separator 36 where product continues to accumulate until the desired count is reached on laser counter 32 or a stack height sensor is tripped. Top interrupter 34 and lift separator 36 should have sufficient strength to support the weight of a single lift or stack portion. At that point, top interrupter 34 will shoot underneath the last of this lift or stack portion to set apart this lift from the stream of product coming from feed table belt assembly 26 and upper belt section 24a. The motion of top interrupter 34 is indicated by arrows in FIGS. 4B and 5.

In other words, top interrupter 34 is used to create gaps in the product flow corresponding to the chosen lift size. In the preferred embodiment, top interrupter 34 is comprised of multiple hollow prongs or fingers made from a suitable rigid material such as stainless steel, aluminum, or a special plastic such as nylatron, spaced a suitable distance from one another and powered by an air compressor that propels a burst of air through holes in the prongs to define a clean separation between the product. By using compressed air, the prongs easily insert into the product stream to form a gap in the product stream without slowing down the overall flow, which allows the machine to run at higher speeds than would be possible if alternative means were used to segregate the individual lifts. Furthermore, the use of compressed air minimizes the tendency for interrupter tab prongs to catch on the product, which frequently causes damage to the product or jams in the machine. While the preferred embodiment uses one top interrupter 34, the number used is dependent on the machine speed desired. Thus, alternative embodiments may use a single top interrupter 34 for low speed applications or multiple interrupters when running at high speeds. The top interrupter 34 described herein could also be used in alternative material handling machinery where it is desired to create gaps in product flow.

Figure 5:
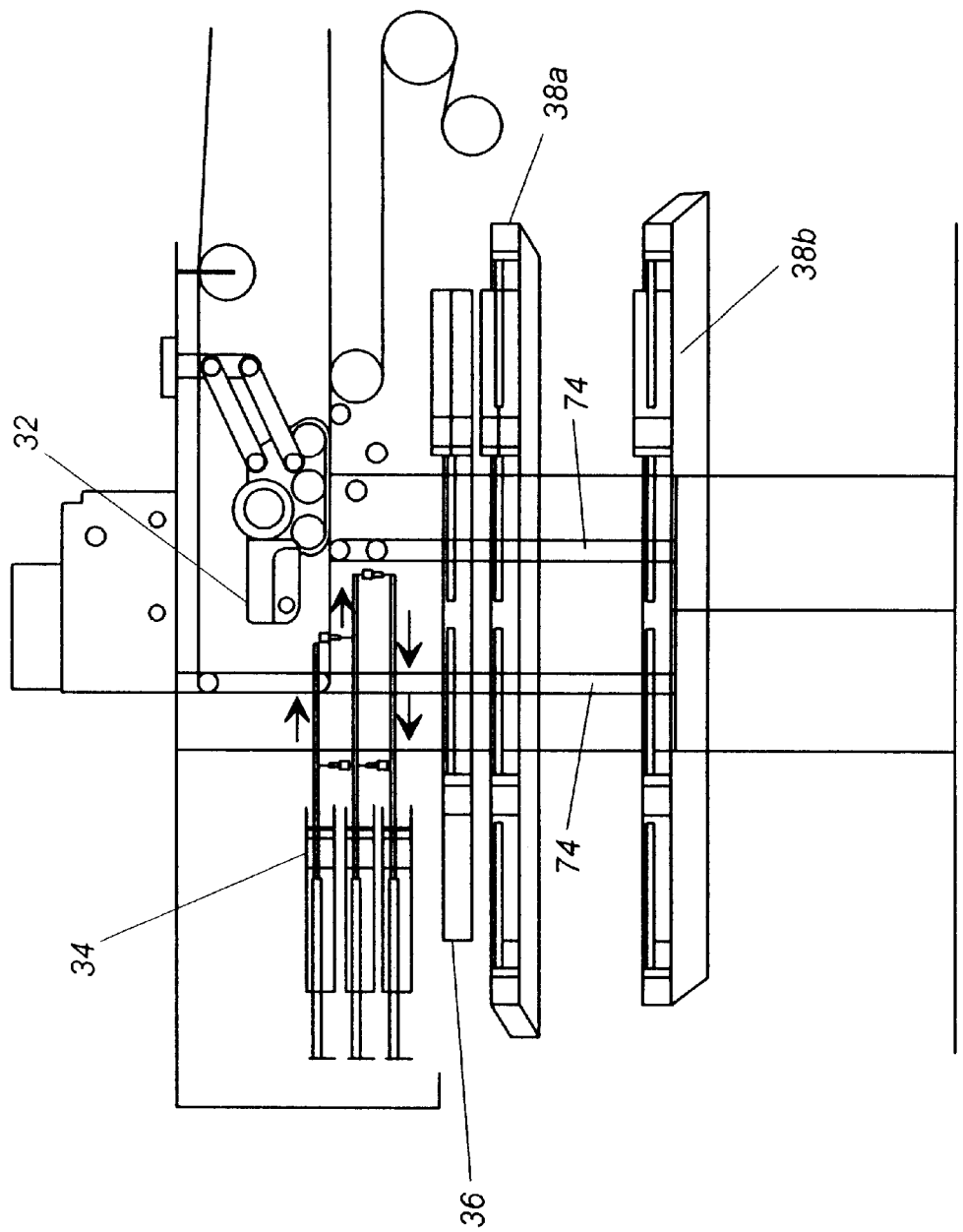
FIG. 5 is an elevation view of the stacking assembly used in the compensating stacking machine of FIG. 1.

Next, lift separator 36 opens up to allow the lift to descend further downward between supports 74 to either left elevator 38a or right elevator 38b. Lift separator 36 closes again after the entire lift has been received by one of the elevators 38a,b. As shown in FIGS. 4B and 5, left elevator 38a is in position to receive a lift. Once a lift is in place, left elevator 38a will descend with the lift and right elevator 38b will move into the position formerly occupied by left elevator 38a to receive the next lift. After reaching its lowest position, left elevator 38a will then move upward to individually compress the lift it holds between itself and the lower surface of right elevator 38b.

Figure 6A:
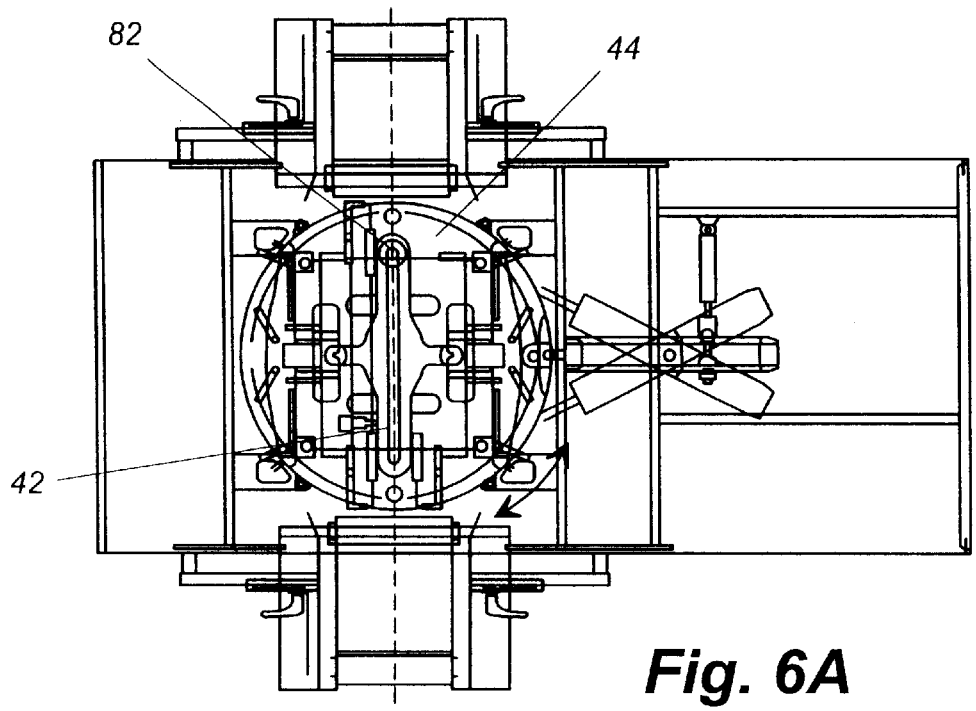
FIG. 6A is a plan view of the turntable compression plate upon which product is received as part of the stacking assembly of FIG. 5.
Figure 6B:
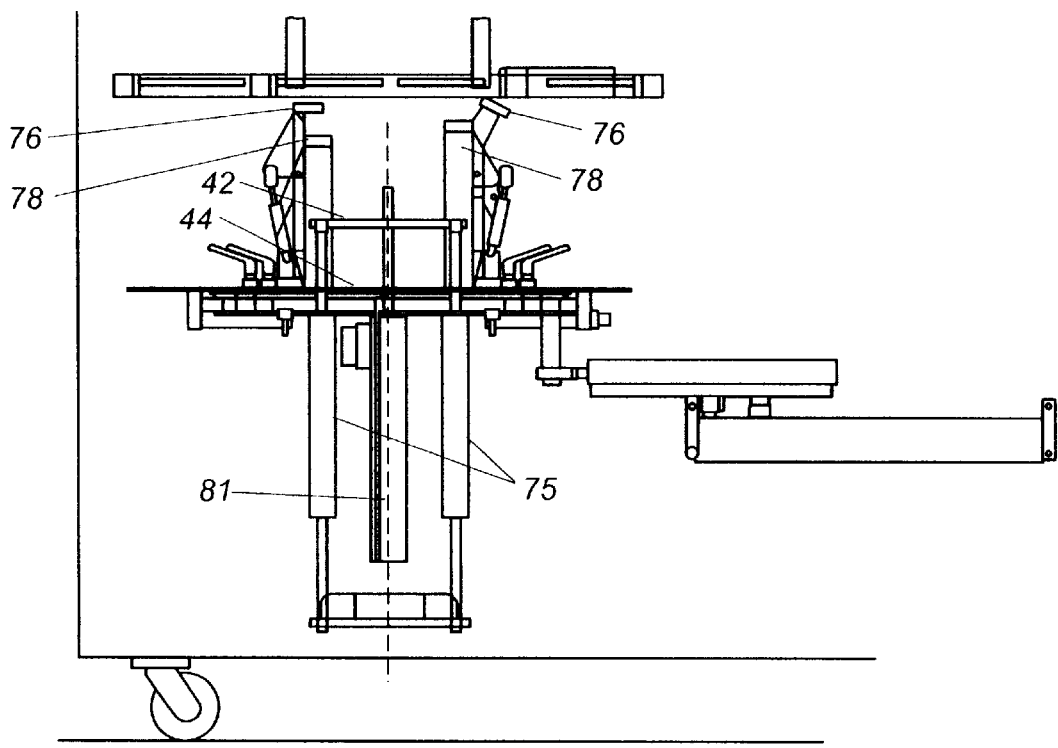
FIG. 6B is an elevation view of the turntable compression plate of FIG. 6A.

Referring now to FIGS. 5, 6A, and 6B, after compressing its lift against the lower surface of right elevator 38b, left elevator 38a drops back down to its lowest position and opens up to deposit the lift onto turntable compressor plate 42, which has ascended to receive the lift via operation of compressor plate pneumatic cylinders 75. Turntable compression plate 42 will then descend with the lift until the plate is flush with turntable 44. To apply a second, more powerful compression, turntable top compressor bars 76 extend from guidebars 78 to provide a brace against which turntable compressor plate 42 rises to compress the lift. Turntable 44 is rotatable so that each lift can be rotated 180° with respect to the previous lift before it is compressed to provide optional compensation to the stack. Thus, every lift will be compressed at least once and preferably twice: once individually between elevator pairs 38a and 38b, and second, between turntable compressor plate 42 and top compressor bars 76. Moreover, if a stack is comprised of more than one lift, then every lift except the last one to complete the stack will be compressed multiple times on turntable compressor plate 42. When stacking machine 20 is running at extremely high speeds, it is sometimes desirable to forego the second compression between turntable compressor plate 42 and top compressor bars 76. Nevertheless, each lift will receive at least one application of compression between elevator pairs 38a and 38b.

Once the desired stack height is reached, pusher rod pneumatic cylinders 81 cause pusher rod 82 to emerge from a slot in turntable compressor plate 42 to engage the side of the stack and push the stack out of stacking machine 20 onto delivery belt 45. Stacking machine 20 can be configured to expel stacks on either the left or right sides. In the preferred embodiment, sensors are used on the sides of stacking machine 20 to detect if a previously expelled stack has not been cleared and direct the machine to expel the current stack to the other side.

In addition to providing multiple compression to each lift, the stacking assembly described herein can operate at much higher speeds than have heretofore been possible primarily through the use of an interrupter, separator, and multiple elevators that allow the machine to operate on more than one lift or stack portion at a time. Existing stacking machines generally require one lift to be expelled before operating on the next lift. While a single interrupter and dual elevators are disclosed herein as the preferred embodiment, it is envisioned that the number of interrupters and elevators could be increased to operate the machine at even higher speeds and efficiency levels.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

I claim:
1. A product stacking machine, comprising:
   infeed means, said infeed means comprising a belt jogger assembly;
   transport means coupling said infeed means to stacking means;
   said stacking means comprising:
      separator means;
      interrupter means, said interrupter means positioned between said separator means and said transport means and controlling a flow of product from said transport means to said separator means;
      first compression means disposed adjacent and concentrically to said separator means and receiving product therefrom; and
      second compression means disposed adjacent and concentrically to said first compression means and receiving product therefrom.
2. The machine of claim 1, wherein said belt jogger assembly comprises:
   a pair of belt joggers complementary positioned on opposing sides of said belt jogger assembly, said belt joggers each comprising an endless belt carried on a drive pulley having a plurality of flat sides formed thereon; and
   a table belt assembly for carrying product between said pair of belt joggers.
3. The machine of claim 2, wherein said belt jogger assembly further comprises:
   a pair of outer belt assemblies disposed on opposing sides of said table belt assembly for carrying product between said pair of belt joggers.
4. The belt jogger assembly of claim 3, further comprising:
   means for mounting said belt joggers and said outer belt assemblies to said belt jogger assembly such that said belt joggers and said outer belt assemblies can be moved in concert together with respect to said table belt assembly.
5. The belt jogger assembly of claim 4, wherein said means for mounting comprises:
   an acme screw that is received through threaded apertures contained in said belt joggers; and
   roller chains connected to said outer belt assemblies, said roller chains being controlled by said acme screw.
6. The machine of claim 1, wherein said infeed means further comprises a first trapped belt conveyor coupled to said belt jogger assembly and said transport means comprises a second trapped belt conveyor, said first and second trapped belt conveyors sharing a common belt assembly.
7. The machine of claim 6, wherein said machine further includes a housing and a base and said first trapped belt conveyor is attached to said machine housing via a pivot and said belt jogger assembly is coupled to said machine base via an adjustment means such that a position of said belt jogger assembly and said first trapped belt conveyor can be set via rotation about said pivot.
8. The machine of claim 1, wherein said interrupter means comprises:
   a plurality of hollow prongs having holes disposed thereon for dispensing air from a compressed air source.

9. The machine of claim 1, wherein first compression means comprises:
   a first elevator and a second elevator, said elevators being in an operative relationship for compressing product held therebetween.

10. The machine of claim 1, wherein said second compression means comprises:
   a turntable having a compressor plate;
   brace means disposed in said stacking means; and
   means for urging said compressor plate towards said brace means.

11. The machine of claim 10, wherein said turntable is rotatable.

12. A stacking machine, comprising:
   a belt jogger assembly for receiving product to be stacked, said belt jogger assembly comprising:
      a pair of belt joggers complementary positioned on opposing sides of said belt jogger assembly, said belt joggers each comprising an endless belt carried on a drive pulley having a plurality of flat sides formed thereon;
      a table belt assembly for carrying product between said pair of belt joggers;
      a pair of outer belt assemblies disposed on opposing sides of said table belt assembly for carrying product between said pair of belt joggers;
      means for mounting said belt joggers and said outer belt assemblies to said belt jogger assembly such that said belt joggers and said outer belt assemblies can be moved in concert together with respect to said table belt assembly;
   a trapped belt assembly for conveying product from said belt jogger assembly to a stacking assembly;
   said stacking assembly comprising:
      a separator;
      an interrupter comprising a plurality of hollow prongs having holes disposed thereon for dispensing air from a compressed air source, said interrupter positioned between said separator and said trapped belt assembly and controlling a flow of product from said trapped belt assembly to said separator;
      first and second elevators for receiving product from said separator, said elevators being in an operative relationship for compressing product held therebetween;
      a rotatable turntable having a compressor plate for receiving product from said first and second elevators;
      a brace disposed in said stacking assembly; and
      means for urging said compressor plate towards said brace to apply compression to product held therebetween.

13. The machine of claim 12, further comprising:
   a pair of rotary joggers positioned between said trapped belt assembly and said stacking assembly for aligning product for entry into said stacking assembly.

14. The machine of claim 13, further comprising:
   a laser counter located proximal to said pair of rotary joggers to obtain a count of product entering said stacking assembly.

15. A belt jogger assembly, comprising:
   a pair of belt joggers complementary positioned on opposing sides of the belt jogger assembly, said belt joggers each comprising an endless belt carried on a drive pulley having a plurality of flat sides formed thereon;
   a table belt assembly for carrying product between said pair of belt joggers;
   a pair of outer belt assemblies disposed on opposing sides of said table belt assembly for carrying product between said pair of belt joggers; and
   means for mounting said belt joggers and said outer belt assemblies to said belt jogger assembly such that said belt joggers and said outer belt assemblies can be moved in concert together with respect to said table belt assembly.

16. A method for stacking product, comprising the steps of:
   providing a product stream;
   channeling said product stream through a belt jogger assembly where a pulsating force is applied to opposing sides of said product stream to improve an alignment of said product stream;
   conveying said product stream to a stacker assembly wherein the following steps are performed:
      inserting an interrupter into said product stream to create a gap in said product stream;
      accumulating product onto a separator until a single lift has been accumulated;
      delivering said single lift to one of a pair of elevators;
      compressing said single lift between said pair of elevators;
      delivering said single lift to a turntable having a compressor plate; and
      compressing said single lift between said compressor plate and a brace.

17. The method of claim 16, further comprising the step of ejecting air from said interrupter to facilitate the insertion of said interrupter in said product stream.

18. The method of claim 16, further comprising the step of rotating said turntable to receive a subsequent lift after compressing said single lift between said compressor plate and said brace.

19. The machine of claim 1, further comprising:
   a movement means disposed on the undercarriage of said machine; and
   a position locking means to fix the position of said machine.

* * * * *